United States Patent [19]

Nebu et al.

[11] Patent Number: 4,938,092
[45] Date of Patent: Jul. 3, 1990

[54] POWER TRANSMISSION CHANGE-OVER DEVICE FOR SMALL SIZED VEHICLES

[75] Inventors: Hideaki Nebu, Saitama; Haruyasu Fujita, Tokyo; Kouichi Uchibaba, Saitama; Kouji Terada, Saitama; Takaaki Tada, Saitama, all of Japan

[73] Assignee: Honda Giken Kogyo Kabushiki Kaisha, Tokyo, Japan

[21] Appl. No.: 393,896

[22] Filed: Aug. 15, 1989

Related U.S. Application Data

[62] Division of Ser. No. 135,229, Dec. 21, 1987, Pat. No. 4,905,536.

[51] Int. Cl.⁵ .............................................. B60K 20/02
[52] U.S. Cl. ................................. 74/473 R; 74/502.2; 180/219; 192/99.5
[58] Field of Search ............... 192/99.5; 180/219, 230; 74/473 R, 502.2

[56] References Cited

U.S. PATENT DOCUMENTS

| | | | |
|---|---|---|---|
| 985,511 | 2/1911 | Carter | 180/230 |
| 3,453,899 | 7/1969 | Tarutani et al. | 74/502.2 X |
| 3,974,707 | 8/1976 | Nagano | 74/502.2 X |
| 4,083,421 | 4/1978 | Van Horn et al. | 74/750 R X |

*Primary Examiner*—Allan D. Herrmann
*Assistant Examiner*—Janice E. Chartoff
*Attorney, Agent, or Firm*—Lyon & Lyon

[57] ABSTRACT

A manually operated gear shift mechanism for a motorcycle, or the like, includes a cable-driven pulley system operative to move a clutch to alternate operative positions in a power transmission system. The cables are arranged such that one is in tension regardless of the direction of rotation of the pulleys. The handle for operating the pulleys carries a releasable locking mechanism operative to secure the pulleys and, concomitantly, the clutch in their respective operative positions.

1 Claim, 5 Drawing Sheets

POWER TRANSMISSION CHANGE-OVER DEVICE FOR SMALL SIZED VEHICLES

This application is a division, of application Ser. No. 135,229, filed 12/21/87 Pat. No. 4,905,536.

BACKGROUND OF THE INVENTION

The present invention relates to power transmission devices for manually manipulating power transmission systems in small sized vehicles.

In small sized vehicles, such as a motorcycle or the like, a clutch lever is generally utilized for placing the power transmission in its various operating conditions. In such apparatus by pivoting a handle grip the clutch lever is swung to pull a clutch cable to, thereby, interrupt clutch operation. When the operating force applied to the clutch lever is released, the clutch lever is returned to its original position by means of the force of a return spring that is contained in the clutch, whereby the latter is adapted to be returned to its connecting condition.

In such a change-over device, when a large force becomes necessary to return the clutch connection, a return spring having a large spring force is required. Accordingly, when it is desired to manipulate the apparatus to interrupt the clutch, the force of the return spring must be added to the operating force of the manipulating apparatus necessary to operate the interruption of the clutch, whereby the force for operating the interruption of the clutch becomes excessive.

It is to the solution of this problem, therefore, that the present invention is directed.

SUMMARY OF THE INVENTION

According to the present invention, there is provided an improved transmission change-over device for small sized vehicles in which the above-described difficulty is overcome. The described device includes a change-over lever rotatably mounted on the vehicle, as for example on the side of the fuel tank, or at another convenient location. The lever is adapted to operate two cables, so-connected to the clutch, that the clutch can be moved in one direction or the other for changing over the vehicle's power transmission system, and always by a cable that is maintained under tension. Thus, the vehicle's power transmission system can be changed over by the simple reciprocation of the change-over lever.

For a better understanding of the invention, its operating advantages and the specific objectives obtained by its use, reference should be made to the accompanying drawings and description which relate to a preferred embodiment thereof.

DESCRIPTION OF THE PREFERRED EMBODIMENT

Figure 1:
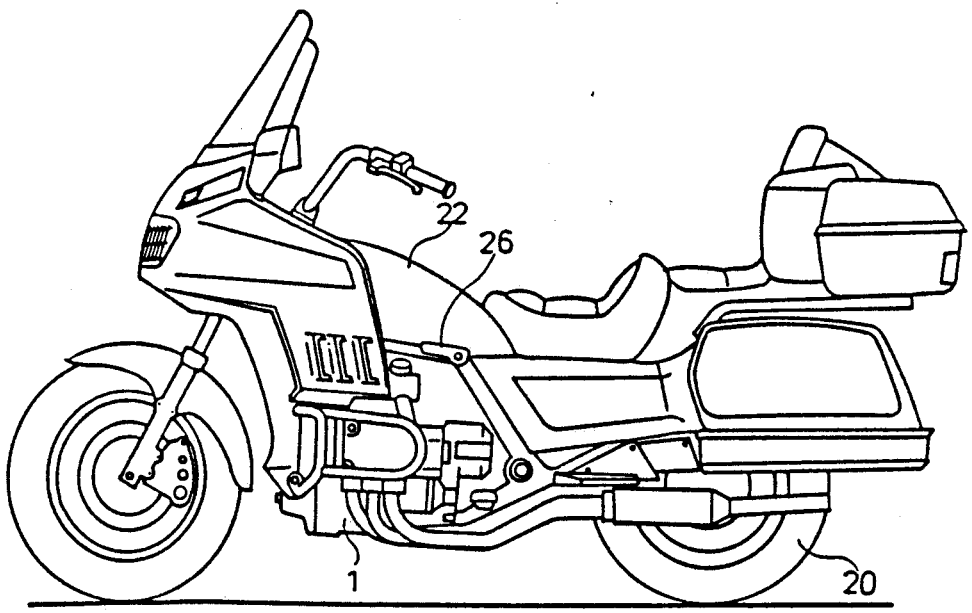
FIG. 1 is a side view of a motorcycle provided with a power transmission change-over device according to the present invention.

Referring to the drawing figures, arranged near an engine 1 is an output shaft 3 of a starter motor 2. Formed on the outer end of the shaft 3 is a coaxial bore 4. One end of a starting shaft 6 is fitted in the bore 4 for coaxial rotation therewith. The starting shaft 6 is rotatably journalled at spaced locations to a crankcase 8 through the intermediary of bearings 9.

Also included is a change-over gear shaft 11 whose axis is parallel to that of the output shaft 3 and the starting shaft 6. The shaft 11 is supported on the crankcase 8 for axial movement and for rotation through the intermediary of the bearings 9a. A gear 12, which is integral with the change-over gear shaft 11, meshes with a gear 5 on the output shaft 3. Gears 13 and 14, respectively, which are both integral with the change-over gear shaft 11, are arranged to engage with, or disengage from, on the one hand, a gear 17, that is integral with the driving shaft 16 and, on the other hand, a gear 7, which is integral with the starting shaft 6. A clutch, indicated generally at 10, is constituted by the output shaft 3, the gear 5, the starting shaft 6, the gears 7, 12, 13 and 14, and the change-over gear shaft 11.

Further, the driving shaft 16 is rotatably supported by the crankcase 8 through the intermediary of the bearings 9b. The driving shaft 16 is mounted parallel to the output shaft 3, the starting shaft 6 and the change-over gear shaft 11. An output gear 19 is fitted on the driving shaft 16 and a damper 18 is interposed between the driving shaft 16 and the output gear 19. The driving shaft 16 is connected to the motorcycle rear wheel 20 through the intermediary of a reduction gear mechanism (not shown) that meshes with the output gear 19.

Furthermore, a sprocket 21 is fitted on the starting shaft 6 through the intermediary of a one way clutch (not shown). This sprocket 21 is connected to the engine 1 through the intermediary of a chain (not shown).

Figure 4:
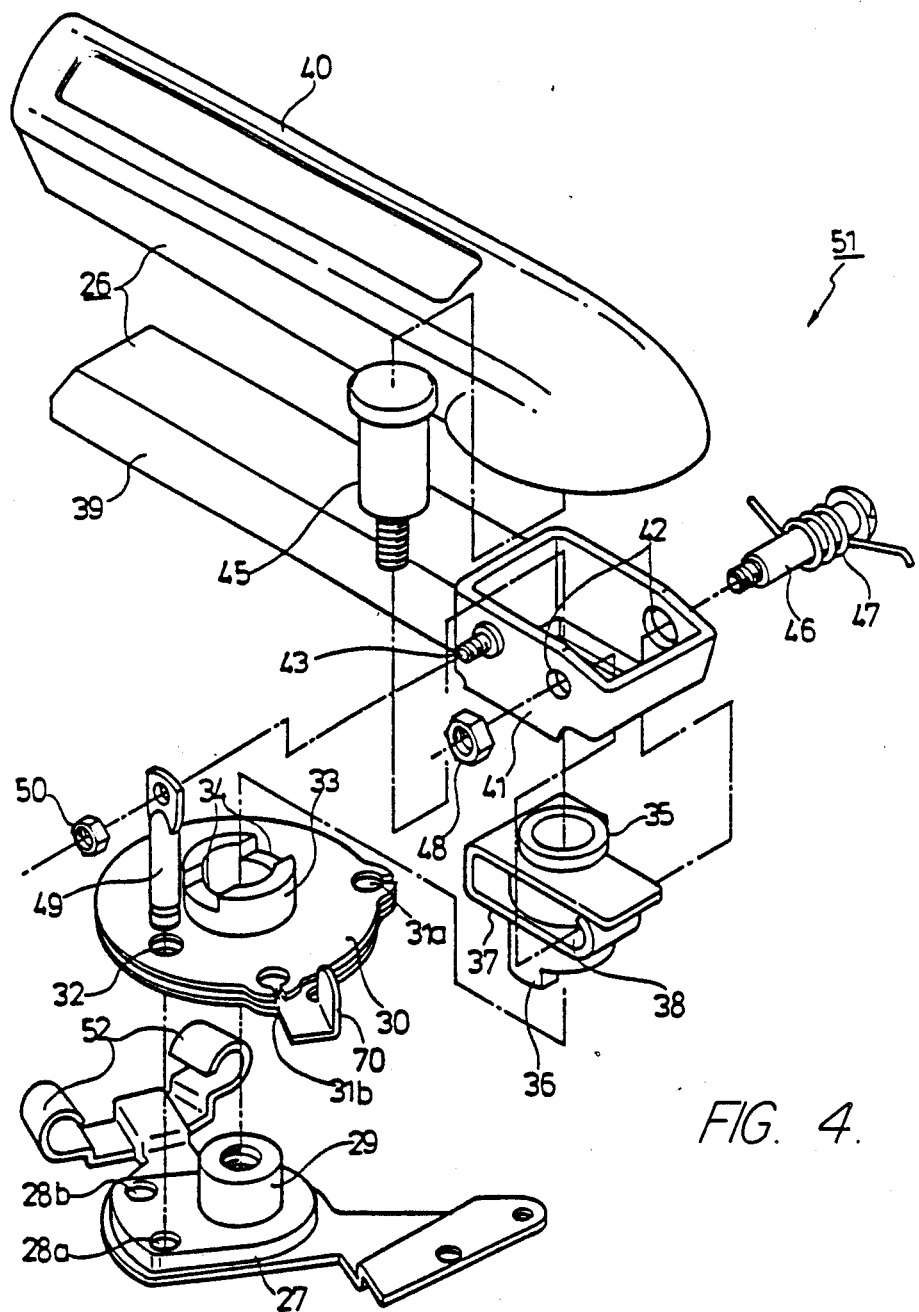
FIG. 4 is an exploded perspective view of the lever mechanism of 3.
Figure 5:
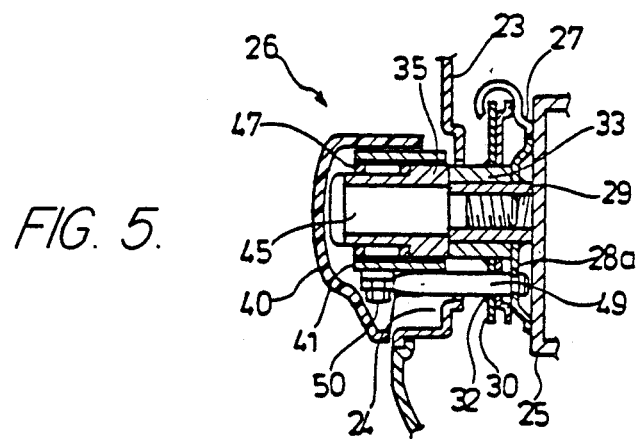
FIG. 5 is a longitudinal sectional view taken along line V—V of FIG. 3.

As shown best in FIG. 5, a recess 24 is formed in the vehicle body cover 23, desirably under the left side of the fuel tank 22, so as to contain a change-over lever 26 therein. A stay 27 is fixed on the vehicle body frame 25 at a position spaced inwardly of the recess 24. In the stay 27 are formed two engaging bores 28a and 28b (FIG. 4). A cylindrical portion 29 is formed integrally on the stay 27.

A pulley 30 is provided with connecting portions 31a and 31b which each connect one end of the respective inners 54a and 54b of cables 53a and 53b described hereinafter. In the pulley 30 is formed a through-bore 32 adapted to register with the engaging bores 28a and 28b of the stay 27. Recesses 34 are formed in end portions of a sleeve 33 which is integral with the pulley 30.

On a boss 35, with which a base 37 is integrally fixed, is formed a projection 36 that is capable of engaging with the recesses 34 of the sleeve 33. On the base 37 is provided an inturned pivot supporting portion 38.

The change-over lever 26 comprises a metal lever body 39 and a plastic cover 40. In the base portion 41 of the lever 39 are provided axially aligned bores 42 to receive a pin 46 that cooperates with the inturned, pivot supporting portion 38 of the base 37. From the left side of the base portion 41 a threaded pivot support 43 projects outwardly.

The change-over operating mechanism 51 comprising the change-over lever 26, the stay 27, the pulley 30 and the boss 35 is assembled in the following manner. The sleeve 33 of the pulley 30 is fitted for rotation on the cylindrical portion 29 of the stay 27. A set screw 45 is fitted into the boss 35 and a leading end of the set screw 45 is screwed in and fastened to the cylindrical portion 29. The pivot pin 46, on which a coil spring 47 is wound, penetrates through the bores 42 of the base portion 41 and the inturned, pivotal supporting portion 38 of the base 37 that is aligned with the bores 42. A nut 48 is threadedly mounted on a threaded portion of the leading end of the pivot pin 46 thereby to attach the supporting portion 38 to the base portion 41. Pin 49 passes through the through-bores 32 of the pulley 30 and engages either one of the bores 28a and 28b of the stay 27. The top portion of the pin 49 contains a hole for connection on the pivot support 43 for pivotably supporting the pin. Finally, a nut 50 is threadedly mounted on the pivot support 43 for pivotably supporting the pin 49.

Figure 6:
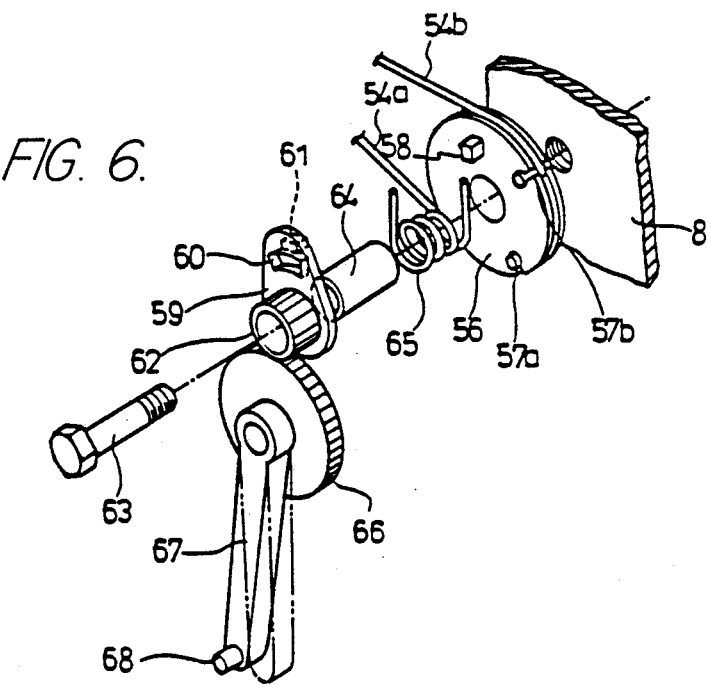
FIG. 6 is an exploded perspective view showing essential parts of the present invention.

Further, on the stay 27 is provided a cable holder 52 which is adapted to grip ends of outers 55a and 55b of the cables 53a and 53b. Also, the other ends of the inners 54a and 54b of the cables 53a and 53b are connected to connecting portions 57a and 57b of a pulley 56(FIG. 6).

An engaging projection 58 projects outwardly from a side face of the pulley 56. A turning arm 59 is provided with a slot 60 which can loosely receive the engaging projection 58. An engaging projection 61 is provided on the rear face of the turning arm 59 adjacent the slot 60. A gear 62 is provided integrally with the turning arm 59 and a coil spring 65 is fitted on a bolt 63 penetrating the turning arm 59 and the gear 62 through the intermediary of a collar 64. The leading end of the bolt 63 penetrates the pulley 56 and is threadedly screwed to the crankcase 8 for mounting the pulley 56 and turning arm 59 for rotation.

The respective ends of the coil spring 65 engage the engaging projections 58 and 61 whereby the pulley 56 and the turning arm 59 are, thus, capable of limited relative rotational movement due to the resilient deformation of the coil spring 65. The turning arm 59 is able, therefore, to incur a lost motion with respect to rotation of the pulley 56, due to the resilient force of the coil spring 65.

A reverse arm 67 is integrally fixed to a gear 66 that is rotatably mounted on the crankcase 8 to mesh with the gear 62. An engaging pin 68 on the leading end of the reverse arm 67 is adapted to engage with an annular groove 15 on the change-over gear shaft 11 for moving the shaft to the right or to the left depending on the direction of rotation of the pulley 56 and, therefore, the gear 66 and arm 67.

A reverse gear switch 69 is arranged on the starter motor 2 at a position facing the reverse arm 67. A projection 70 extends from the pulley 30 to engage the limit switch 69 which is turned off when pushed by the projection 70 at a lower limit position of the change-over lever 26. A reverse operation detecting limit switch 71 is arranged to turn on when the change-over lever 26 is pulled upwardly.

Figure 2:
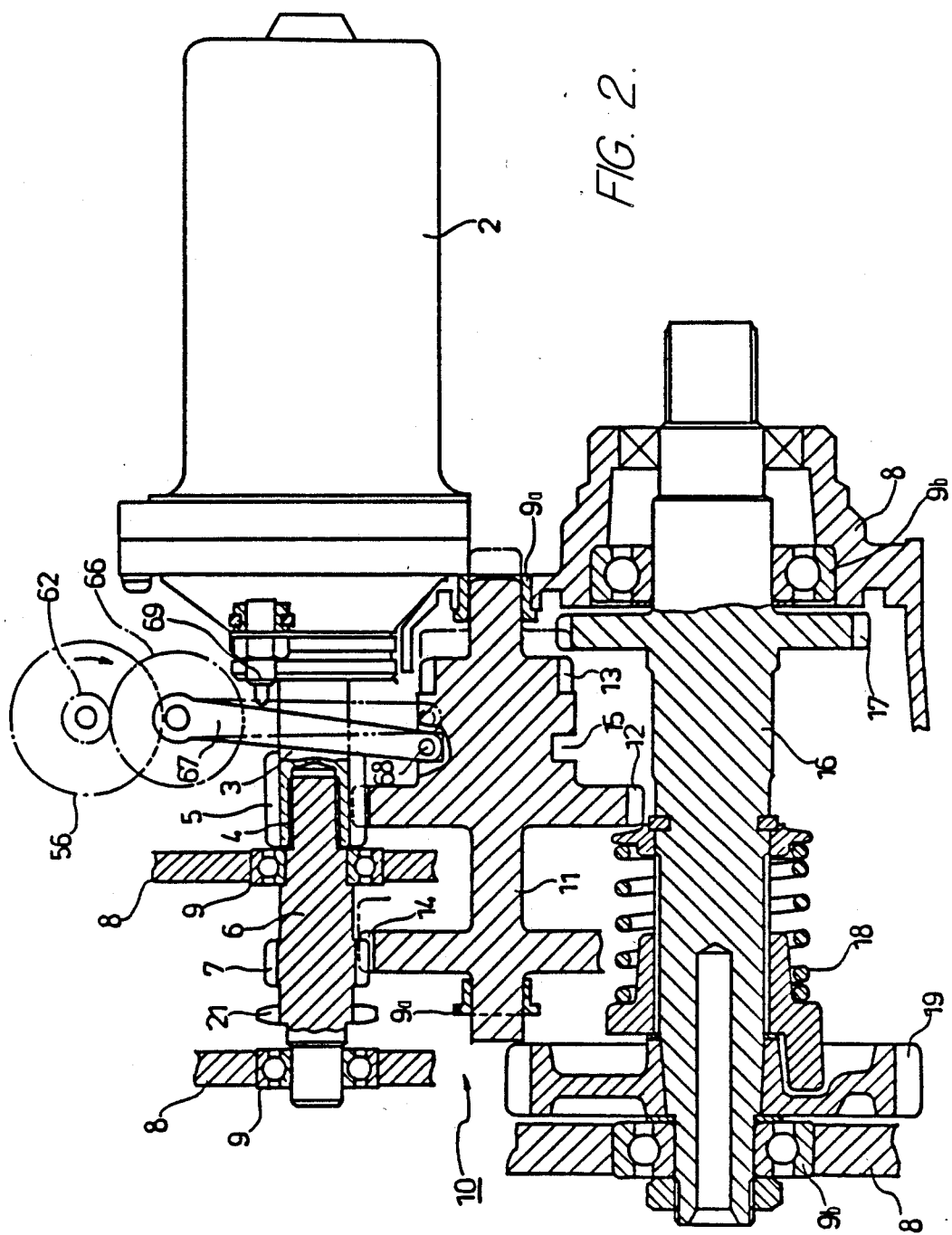
FIG. 2 is, a sectional elevational view showing essential parts of the device of FIG. 1.
Figure 3:
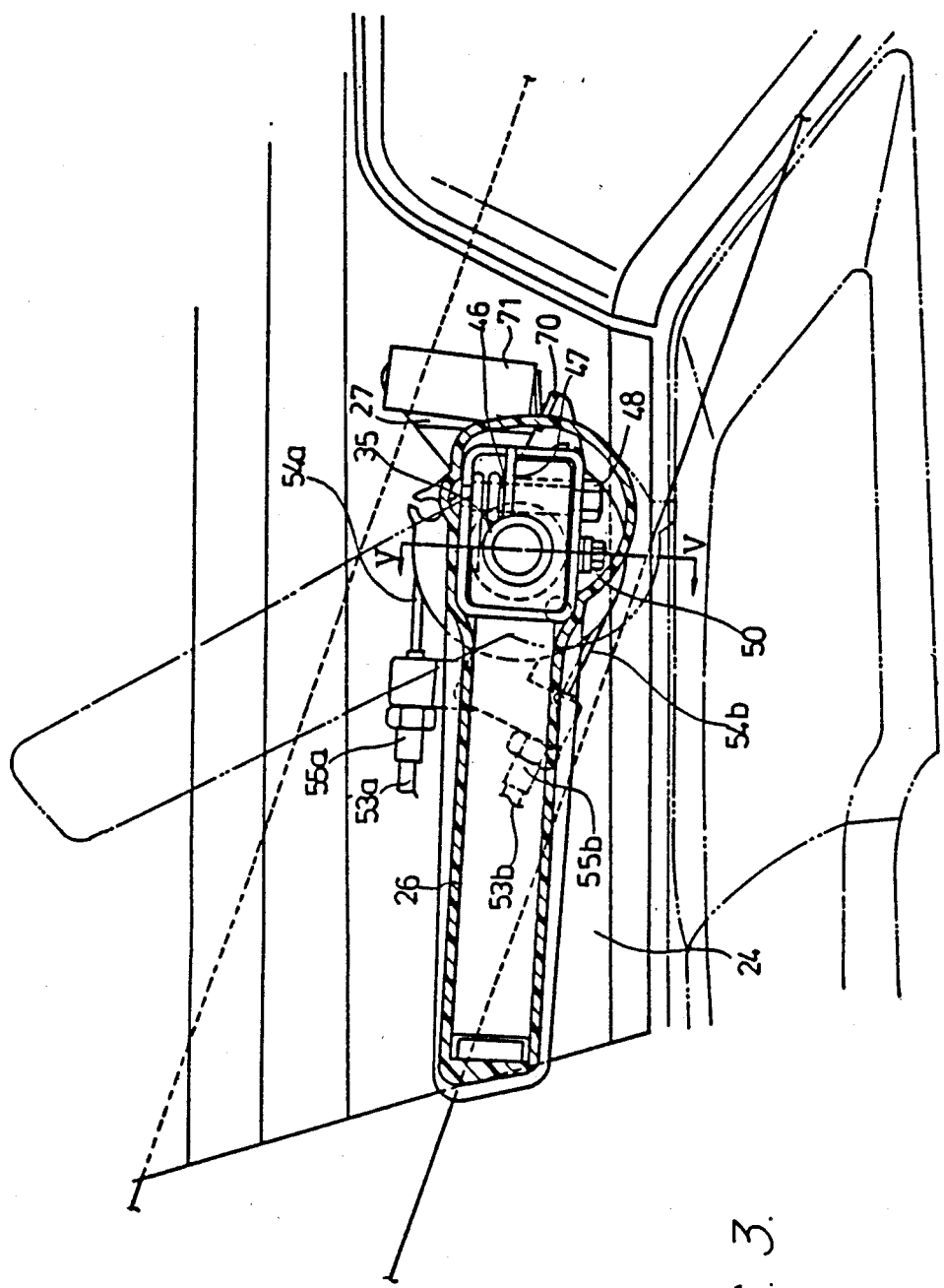
FIG. 3 is a view, partly in section, showing the change-over lever mechanism of the present invention.

The operation of the hereindescribed apparatus is as follows. When the change-over lever 26 is disposed in its lower position (illustrated by solid lines in FIG. 3), the pin 49 carried by pulley 30 is engaged into the engaging bore 28a of stay 27 whereby the change-over lever 26 is not capable of being rotated. In this condition, the reverse arm 67 is disposed in the position shown by the full lines in FIG. 2 so that the change-over gear shaft 11 is in the left hand position. With the gear shaft 11 in this position, the gear 13 on the change-over gear shaft 11 is disengaged from the gear 17 of the driving shaft 16 and the gear 14 of the change-over shaft 11 is meshed with the gear 7 of the starting shaft 6. Accordingly, the sprocket 21 of the starting shaft 6 is rotated by operation of the starter motor 2 and the start-up of the engine 1 is effected.

When the engine 1 is started, the rotary torque from the engine 1 is not transmitted to the starter motor 2 due to the presence of a one-way clutch (not shown), the operation of which is well known, self-contained in the sprocket 21. Thus, the starter motor 2 is not forcibly rotated or driven by the engine 1.

Alternatively, with the change-over lever 26 in its lowered position and the engine 1 and the starter motor 2 stopped, when the change-over lever 26 is pulled to the left side, it is raised up with the pivot pin 46 as a center and the pin 49 is drawn out to the side. Then, since the pin 49 is disengaged from the engaging bore 28a of the stay 27, the change-over lever 26 is capable of being rotated. Thus, in the condition in which the change-over lever 26 is first moved outwardly and, then, pulled upwardly, the pulley 30 that is integral with the change-over lever 26 can be turned in a clockwise direction as viewed in FIG. 3. Consequently, since the inner 54a of the cable 53a is pulled, the pulley 56 is also turned in a clockwise direction as viewed in FIGS. 2 and 6. The reverse arm 67 is thereby turned in a counterclockwise direction and assumes the position shown by the broken line in FIG. 2. By this action, the change-over gear shaft 11 is moved to the right side and the gear 14, which has been meshed with the gear 7, is disengaged therefrom. On the other hand, the gear 13 of the change-over gear shaft 11 now becomes meshed with the gear 17 of the driving shaft 16.

Also, when the change-over lever 26 is pulled upwardly, the reverse operation detecting limit switch 71 is turned on. Thereafter, if the change-over lever 26 is pivoted downwardly toward the vehicle body side, the pin 49 is fitted into the engaging bore 28b, whereby the change-over lever 26 and the pulley 30 cannot be rotated.

Accordingly, in this condition, if the starter motor 2 is operated, the driving shaft 16 is driven in the reverse direction, whereby the rear wheel 20 rotates backwardly and, therefore, the motorcycle is operated in the reverse direction.

In the condition in which the change-over lever 26 is turned to an intermediate position between the upper limit and the lower limit, because the pin 49 is not fitted into either of the engaging bores 28a or 28b, the leading end of the pin 49 strikes the side surface of the stay 27, whereby the change-over lever 26 cannot be brought down to the vehicle body side. Accordingly, it does not permit the starter motor 2 to operate when the change-over lever 26 is in such intermediate position.

Further, because the change-over operating mechanism 51 contains a lost motion capability, when the change-over lever 26 is moved to either its upper limit or its lower limit, even if the gear 14 does not mesh with the gear 7 or the gear 13 does not mesh with the gear 17 by the fact that the teeth of the gear 14 on the change-over gear shaft 11 strikes against the teeth of the gear 7 on the starting shaft 6 rather than engaging with them, or a similar situation exists as regards the gear 13 on the change-over gear shaft 11 or the gear 17 on the driving shaft 16, the starter motor 2 can be rotated. Thus, when the gear 14 and the gear 13 are slightly rotated, the reverse arm 67 is pivoted under the influence of the force of the coil spring 65 and the change-over gear shaft 11 is pushed either to the left side or to the right side, whereby the gear 14 can mesh with the gear 7 or the gear 13 can mesh with the gear 17 and, therefore, the change-over operation of the clutch is effectively performed.

Further, when the change-over lever 26 is rotated in either a clockwise or a counterclockwise direction, since either the inner 54a of the cable 53a or the inner 54b of the cable 53b is pulled, the operating force of the change-over lever 26 can effectively be transmitted to the pulley 56.

Thus, in this arrangement, because one of the two flexible connecting members connecting the clutch and the change-over lever is always in tension, regardless of the direction the change-over lever is rotated, the operating force of the change-over lever is effectively transmitted to the clutch.

For this reason, it is possible to perform the connection or disconnection of the clutch rapidly and effectively. Also, because the force of a return spring is not required, the operating force necessary to operate the change-over lever is significantly reduced.

It should be appreciated that, in the described apparatus, because the change-over lever is arranged to the side of the fuel tank, or other readily accessible position on the vehicle, the driver is capable of very easily performing the change-over operation with one hand.

It should be further understood that, although a preferred embodiment of the invention has been illustrated and described herein, changes and modifications can be made in the described arrangement without departing from the scope of the appended claims.

We claim:

1. In a motorcycle having a body covered by a body cover and mounting longitudinally spaced front and rear wheels, an engine disposed intermediate said front and rear wheels, a power transmission capable of operating in different operating conditions interconnecting said engine and said rear wheel, a clutch for alternately placing said power transmission in forward and reverse operating conditions, means for operating said clutch comprising:

a recess in an accessible position on said body cover on a lateral side thereof;

a rotatably mounted change-over lever positioned in said recess; and connecting means extending between said change-over lever and said clutch for operating said clutch to place said power transmission in said respective operating conditions, said connecting means including:

a pulley operably connected to said change-over lever for rotation therewith;

a pair of cables, each connected at one end to said clutch to impose movement therein in one of two alternate directions between said forward operating condition and said reverse operating condition; and the other ends of said cables each connecting said pulley on opposite sides of the axis of rotation thereof, whereby one of said cables is in tension when said pulley is rotated in either a clockwise or a counterclockwise direction.

* * * * *